United States Patent
Christian et al.

[19]

[11] Patent Number: 6,003,208
[45] Date of Patent: Dec. 21, 1999

[54] PARALLEL ENTRY TIE

[75] Inventors: Kenneth A Christian, Milwaukee; Mark A Federspiel, West Bend, both of Wis.

[73] Assignee: Tyton Hellerman Corporation, Milwaukee, Wis.

[21] Appl. No.: 09/044,366

[22] Filed: Mar. 19, 1998

Related U.S. Application Data

[63] Continuation-in-part of application No. 08/833,640, Apr. 8, 1997, Pat. No. 4,890,265, which is a continuation of application No. 08/571,396, Dec. 13, 1995, abandoned.

[51] Int. Cl.$^6$ ................................................ B65D 63/00
[52] U.S. Cl. .................................... 24/16 PB; 24/30.5 P
[58] Field of Search ........................... 24/16 PB, 16 R, 24/30.5 R, 30.5 P, 17 AP; 248/74.3

[56] References Cited

U.S. PATENT DOCUMENTS

| | | | |
|---|---|---|---|
| 3,731,347 | 5/1973 | Caveney et al. | 24/16 PB |
| 3,842,688 | 10/1974 | Baginski | 24/16 PB |
| 4,287,644 | 9/1981 | Durand | 24/16 PB |
| 4,574,434 | 3/1986 | Shupe et al. | 24/16 PB |
| 5,414,904 | 5/1995 | Sampson | 24/16 PB |
| 5,745,957 | 5/1998 | Khokhar et al. | 24/16 PB |

FOREIGN PATENT DOCUMENTS

| | | | |
|---|---|---|---|
| 90726 | 10/1983 | European Pat. Off. | 24/16 PB |
| 2462600 | 2/1981 | France | 24/16 PB |

*Primary Examiner*—James R. Brittain
*Attorney, Agent, or Firm*—Ryan Kromholz & Manion, S.C.

[57] ABSTRACT

A parallel entry tie include a flexible strap having a locking head and a free end. The strap is received in a passage in the locking head where it is engaged by a locking tab which is biased toward engagement with the strap as it passes into and through the passage. The locking tab prevents withdrawal of the tie from the locking head. The strap can be released for withdrawal from the locking head by moving the tab against the bias. An opening is provided in the locking head generally opposite to the location of the locking tab. The strap, throughout the major portion of its extension, has a width which is less than the width of the opening. The opening in the locking head is preferably provided with spaced shoulders in the area of the engagement between the locking tab and the straps serrations. An inclined lip is provided in the area through which the strap exits the locking head. The lip is angled such as to displace the strap from the normal exterior of the strap. In one embodiment, a pair of V-shaped notches in the locking head enable the locking head to flex and thereby conform to the shape of items encircled by the tie. In another embodiment, a plurality of raised tabs formed in the strap near the locking head define a channel for containing the projecting tail portion of the strap after it is inserted through the locking head.

14 Claims, 4 Drawing Sheets

PARALLEL ENTRY TIE

RELATED APPLICATION

This is a continuation-in-part of U.S. patent application Ser. No. 08/833,640 filed Apr. 8, 1997 now U.S. Pat. No. 5,890,265, which, in turn, is a continuation of abandoned U.S. patent application Ser. No. 08/571,396 filed Dec. 13, 1995, now abandoned both of which applications are commonly owned by the assignee hereof.

BACKGROUND OF THE INVENTION

This invention relates to flexible ties and, more particularly, to ties of the parallel entry type.

Flexible ties for use in bundling elongated members such as wires, cables, etc. are well known.

Typically, such ties include an elongated flexible strap made of suitable plastic material. The tie usually has a free end and a locking mechanism at the opposite end. The strap is capable of being turned on itself 360° for insertion into the locking head after which the diameter of the loop thus formed can be adjusted to snugly fit over the intended bundle.

A parallel entry tie is one wherein the insertion of the strap into the locking head and then its extension into and through the locking head is generally in alignment with the loop which is formed, as opposed to being at a lateral angle to the loop.

Various constructions of parallel entry ties have been proposed. The desirable characteristic in any tie, and particularly so in a parallel entry tie, is a low insertion force while obtaining a positive and reliable connection of the strap in the locking head to maintain the adjusted loop diameter. For the most part, prior ties of this type have been lacking in either one or both of those characteristics.

SUMMARY OF THE INVENTION

The invention provides a parallel entry tie including an elongate flexible strap having an elongate locking head at one end and a tail portion insertable through the locking head at the other end. Structure is provided within the locking head for engaging and retaining the flexible strap when the tail portion of the strap is inserted through the locking head so that the tie can be formed into a loop and secured in such a looped condition. The locking head further including an area of increased flexibility that enables the locking head to flex and thereby conform to the shape of the loop formed by the tie.

The invention also provides a parallel entry tie including an elongate flexible strap having an elongate locking head at one end and a tail portion insertable through the locking head at the other end. Structure is provided within the locking head for engaging and retaining the flexible strap when the tail portion of the strap is inserted through the locking head so that the tie can be formed into a loop and secured in such a looped condition. The flexible strap further includes an area of increased width adjacent the locking head and further has a plurality of raised tabs defining a channel for receiving the tail portion of the strap after the tail portion is inserted through the locking head.

The invention further provides a parallel entry tie including an elongate flexible strap having an elongate locking head at one end and a tail portion insertable through the locking head at another end. The tie further includes structure within the locking head for engaging and retaining the flexible strap when the tail portion of the strap is inserted through the locking head so that the tie can be formed into a loop and secured in such a looped condition. The locking head includes an area of increased flexibility that enables the locking head to flex and thereby conform to the shape of the loop formed by the tie. The flexible strap includes an area of increased width adjacent the locking head and further includes a plurality of raised tabs defining a channel for receiving the tail portion of the strap after the tail portion is inserted through the locking head.

It is an object of the invention to provide a new and improved parallel entry tie that provides desirable holding characteristics in combination with a low insertion force.

It is a further object of the invention to provide a tie that readily conforms to the shape of items encircled by the tie.

It is a further object of the invention to provide a tie that presents a smooth exterior surface that is substantially free from sharp edges or other discontinuities.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DETAILED DESCRIPTION OF THE PREFERRED EMBODIMENT

Figure 1:
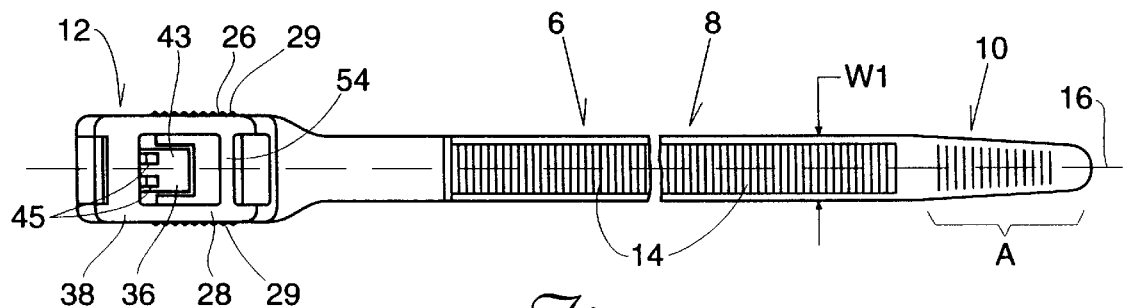
FIG. 1 is a plan view of a flexible tie of the present invention.
Figure 2:
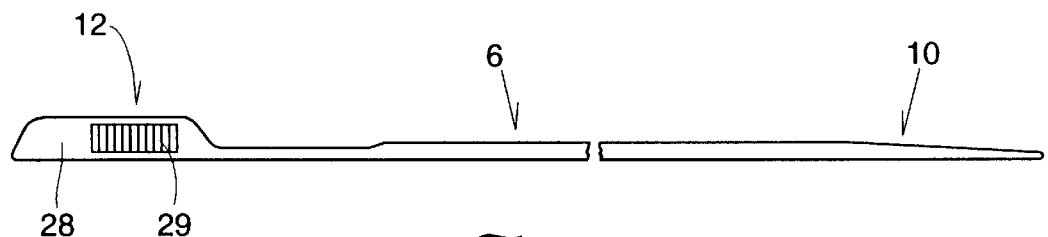
FIG. 2 is a side view of the flexible tie of FIG. 1.

Referring to FIGS. 1 and 2, the invention provides a flexible tie 6 that can be used for securing various items, such as individual wires or cables, into a bundle. The tie 6 can also be used in other applications wherein it is desired to encircle items with a securing structure that can be tightened and cinched around the items.

As illustrated, the tie 6 includes an elongate strap 8 having a free end 10 and a locking head 12 opposite the free end. A series of transverse serrations 14 are provided along a length of the strap 8.

As can be seen in FIG. 1, the strap 8 normally extends along a longitudinal axis 16. Because it is flexible, the strap 8 can be formed into a loop to position the free end 10 at the locking head 12. This is partially illustrated in FIGS. 3, 4 and 5 wherein the free end 10 is shown being looped in and through the locking head 12.

Figure 3:
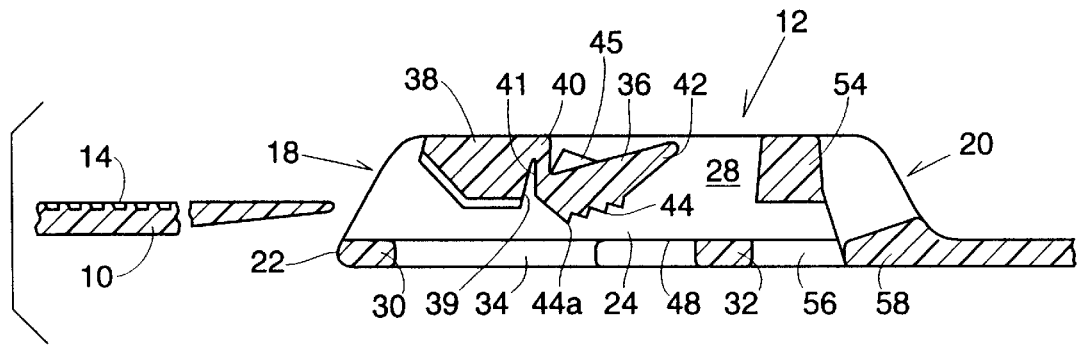
FIG. 3 is a section view through the free end of the flexible tie and the locking head after the strap has been looped on itself and just prior to entry of the strap into the locking head.

Referring to FIG. 3, the locking head 12 includes an entrance end 18, an exit end 20 and a lower side 22. The lower side 22 of the locking head 12 is generally aligned with the longitudinal axis 16. A passage 24, dimensioned to receive the free end 10, is defined in the locking head 12 and is formed in part by lower side 22 and side walls 26 and 28 (FIG. 1). The side walls 26 and 28 include integrally formed ribs 29 that act as finger grips to enable a user to firmly grip the locking head 12 (FIG. 2).

The lower side 22 of the locking head 12 is formed by a pair of ribs 30 and 32 that are spaced apart to define an opening 34 therebetween. A rib 54 is provided between the side walls 26 and 28 at the exit end 20 of the locking head 12. Rib 54, in cooperation with rib 32, insures effective movement of the free end 10 of the strap 8 through passage 24 and out of exit end 20. An opening 56 is provided in the lower portion 22 between rib 32 and another rib like portion 58, with that opening being generally opposite to rib 54. This arrangement again reduces the insertion force required to move the free end 10 of the strap 8 through the locking head 12.

A locking tab 36 having a plurality of teeth 44 formed thereon is positioned opposite the opening 34 and is connected to a rib 38 extending between the side walls 26 and 28 by means of a hinge section 40. The hinge section 40 produces a natural bias on the locking tab 36 which, in the illustrated embodiment, is in a clockwise direction as viewed in FIGS. 3, 4 and 6. When the free end 10 of the strap 8 is not in passage 24, the locking tab 36 assumes the normal or first position as viewed in FIG. 3.

Figure 4:
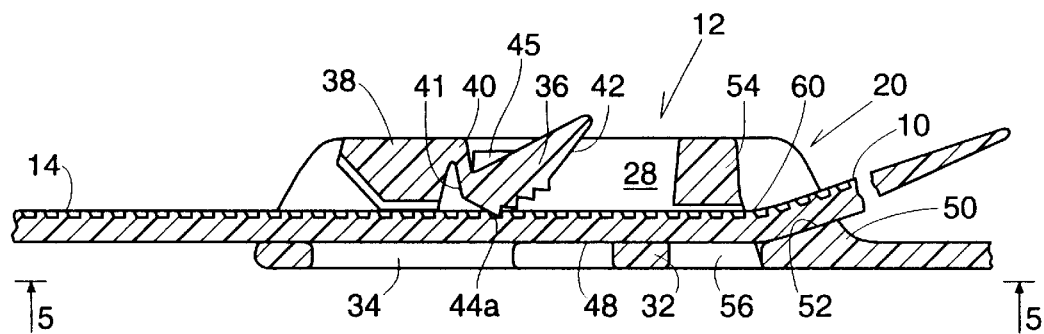
FIG. 4 is a section view similar to FIG. 3 but with the strap inserted into and partially through the locking head.

As the free end 10 of the strap 8 is inserted into the passage 24 as shown in FIG. 4, the locking tab 36 pivots from its first position to a second position in which only one tooth 44A of the locking tab 36 engages the serrations 14. With only one tooth 44A engaging the serrations 14, the insertion force of the free end 10 of the strap 8 into the passage 24 is minimized.

Figure 6:
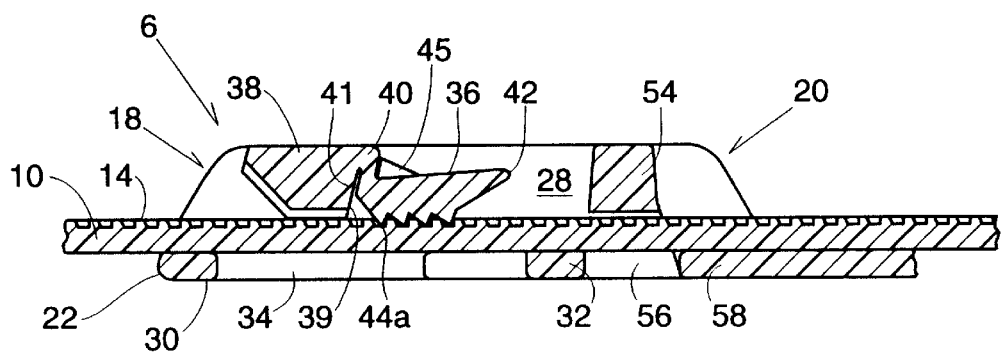
FIG. 6 is a sectional view similar to FIG. 3 showing the flexible tie in its loaded or locked position.
Figure 7:
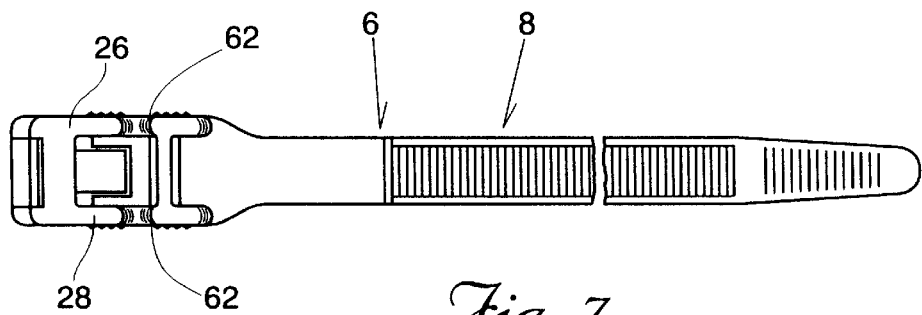
FIG. 7 is a top plan view of an alternate embodiment flexible tie embodying various features of the invention.

After the free end 10 of the strap 8 is inserted into the passage 24, any withdrawing movement of the strap 8 will pivot the locking tab 36 around the hinge 40 thereby engaging all of the teeth 44 with the serrations 14. In this loaded or locked position as shown in FIG. 6, the surface 39 of rib 38 abuts or is in engagement with the opposed surface 41 of the locking tab 36 so that the tension forces applied on the strap 8 are absorbed by surfaces 39 and 41. Thus, in the locked position, withdrawal of the free end 10 from the passage 24 is substantially prevented.

As shown in FIG. 6, a tip portion 42 formed at the end of the locking tab 36 allows for ready release of the free end 10 of the strap 8 from the passage 24. To release the free end 10, the tip portion 42 is lifted upwardly to disengage the teeth 44 from the serrations 14 and allow the free end 10 to be removed from passage 24. This release feature is important in instances where strap 8 is reusable or is used in an application where cutting the free end 10 may expose the surrounding material to damage. If the strap 8 does not need to be releasable, the tip portion 42 can be omitted from locking tab 36.

Referring to FIG. 1, the locking tab 36 is preferably provided with two stops 45 on its top surface 43. The stops 45 limit the upward and counterclockwise movement of the locking tab 36 so that when the free end 10 is being released from the passage 24, the locking tab 36 is not overextended or damaged.

Figure 5:
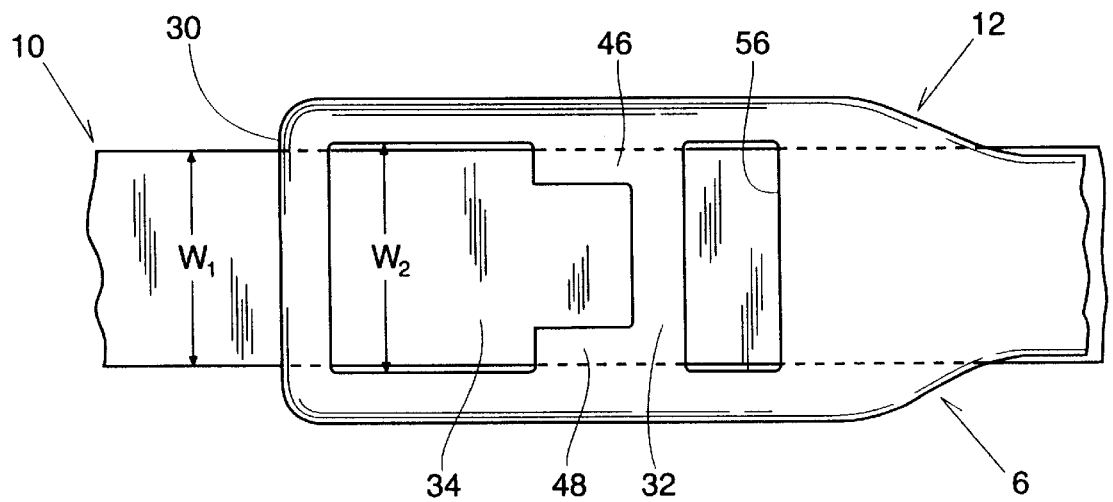
FIG. 5 is a bottom view of the tie shown in FIG. 4 taken along line 5—5 thereof.

With reference to FIGS. 1 and 5, the free end 10 of strap 8 has a width W1 which is generally uniform along the longitudinal axis 16 but tapers down to a lesser width in an area A adjacent the free end 10. Opening 34 has a width W2 which, in the preferred embodiment, is greater than the width W1.

Opening 34 in the locking head 12 and particularly in the area of the locking tab 36, helps to reduce the force required to insert the free end 10 into and then through the passage 24. Similarly, making the width W2 of the opening 34 greater than the width W1 of the free end 10 further reduces the insertion force.

Referring again to FIG. 5, a pair of spaced shoulders 46 and 48 are provided in opening 34 and in the area of the locking tab 36. The shoulders 46 and 48 overlap part of the locking tab 36 and terminate adjacent to the teeth 44, which engage the serrations 14. With this arrangement, the shoulders 46 and 48 cooperate to ensure firm engagement between the teeth 44 and the serrations 14 without materially increasing the insertion force.

As best seen in FIG. 4, an inclined lip 50 defining an inclined surface 52 can, optionally, be formed at the exit end 20 of the locking head 12. As the free end 10 of the strap 8 exits the locking head 12, the inclined surface 52 deflects the free end 10 of the strap upwardly and away from the remainder of the strap 8. This makes it easier to sever off any excess portion of the free end 10 should it be desired to do so after the tie 6 is installed.

It will be appreciated that, in the complete tie 6, the passage 24 is defined, at least in part, by the ribs 30, 32, 38, 54, and 58, in combination with the side walls 26 and 28.

Figure 8:
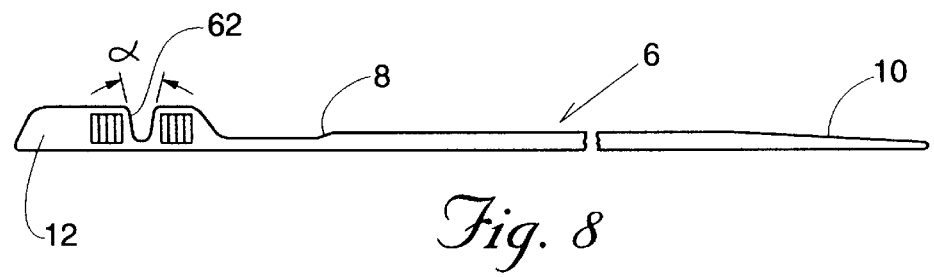
FIG. 8 is a side elevation view of the tie shown in FIG. 7.
Figure 9:
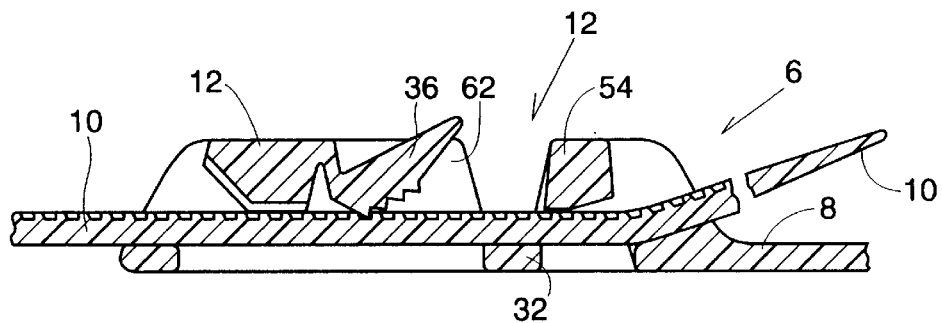
FIG. 9 is an enlarged, fragmentary sectional view of the locking head portion of the flexible tie shown in FIGS. 7 and 8.
Figure 10:
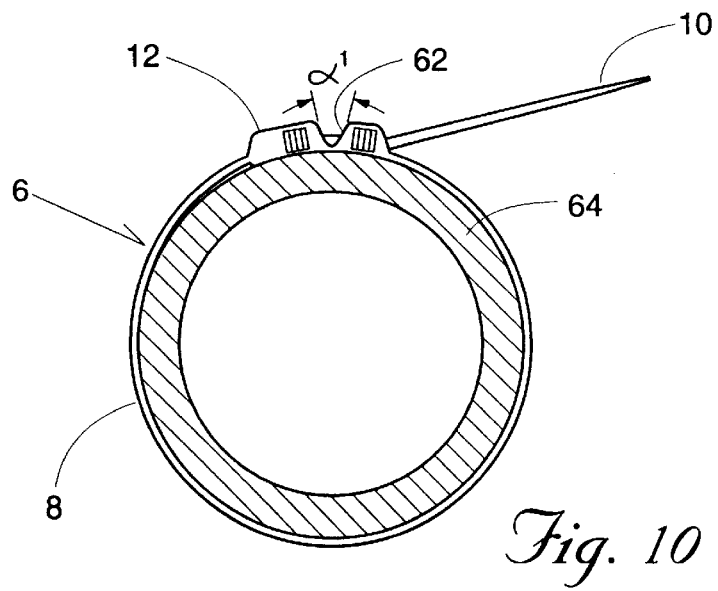
FIG. 10 is side view of the tie of FIGS. 7–9 shown installed onto a cylindrical object.
Figure 11:
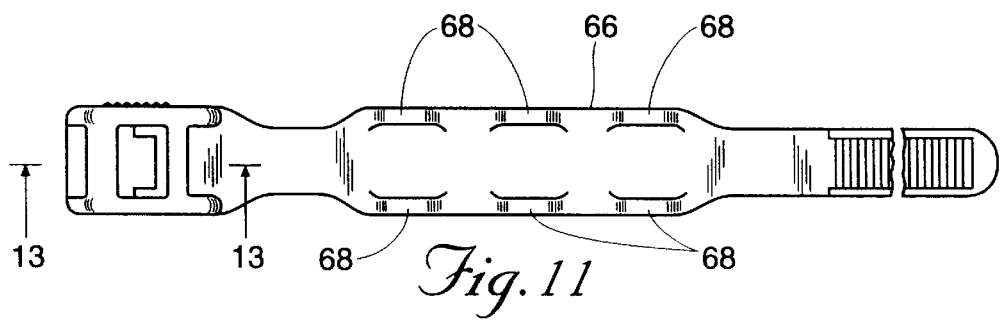
FIG. 11 is a top plan view of still another alternate embodiment flexible tie embodying various features of the invention.
Figure 12:
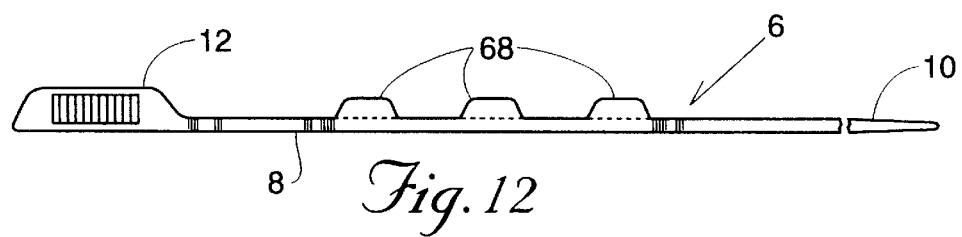
FIG. 12 is a side elevation view of the tie shown in FIG. 11.
Figure 13:
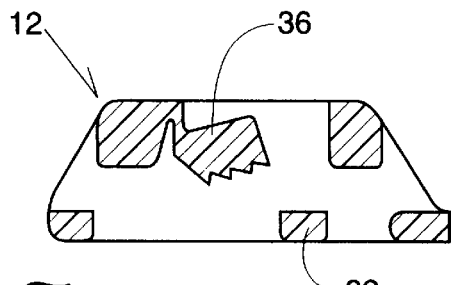
FIG. 13 is an enlarged, fragmentary sectional view of the locking head portion of the flexible tie shown in FIGS. 11 and 12.

An alternate embodiment flexible tie 6 is shown in FIGS. 7–10. In this embodiment, a V-shaped notch 62 is formed in each of the locking head side walls 26, 28. These notches 62, which are preferably positioned opposite each other across the width of the strap 8 between the locking tab 36 and the rearmost upper rib 54, allow the locking head 12 to flex when the tie 6 is installed around a cable bundle or other structure. By enabling the locking head 12 to flex in this manner, the locking head 12 is less likely to form a rigid segment or hard spot in the installed tie 6, and the tie 6 can better conform to the external shape of the structure encircled by the tie. For example, and as shown in FIG. 8, before the tie 6 is installed, the locking head 12 is substantially straight and a first angle α is defined by each notch 62. When the tie 6 is installed around a curved structure 64 as shown in FIG. 10, the locking head 12 flexes, thereby increasing the angle defined by each notch 62 to a greater angle α'. This allows the locking head 12 to conform more closely to the exterior shape of the item 64, thereby resulting a neater and more closely fitting installation.

Still another embodiment of the flexible tie 6 is shown in FIGS. 11–16. In this embodiment, the width of the strap 8 is increased over a section 66 of its length in the area behind the locking head 12. In addition, a plurality of opposed, raised tabs 68 are formed along the side edges of the section 66 and are spaced from each other by a distance sightly greater than the width of the free end 10 of the strap 8. Accordingly, when the strap 8 is inserted through the locking head 12, the free end 10 of the strap 8 that extends through the head is confined between the tabs 68.

Figure 16:
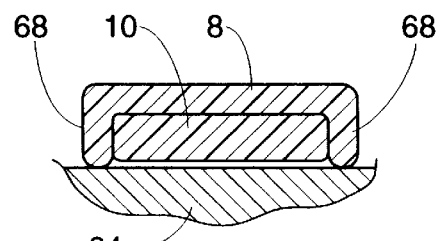
FIG. 16 is a cross-sectional view of the tie shown in FIG. 15 taken along line 16—16 thereof.
Figure 14:
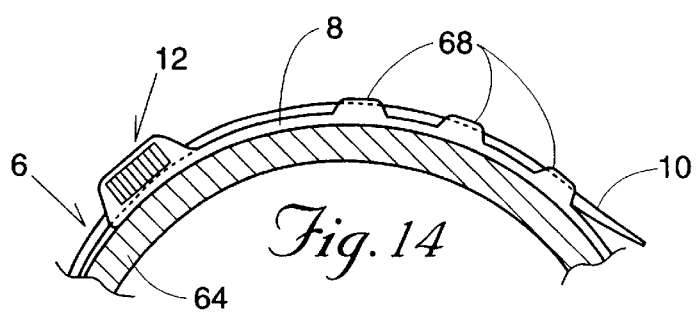
FIG. 14 is fragmentary side view of the tie of FIGS. 11–13 shown installed onto a cylindrical object in a standard position with the tie tail portion of the tie uppermost.
Figure 15:
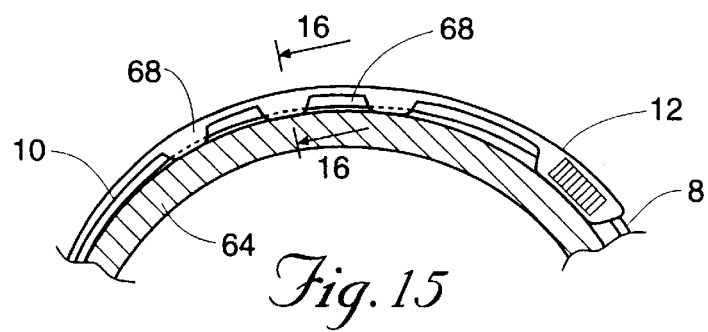
FIG. 15 is a fragmentary side view, similar to FIG. 14, showing the flexible tie installed in an inverted position with the tie tail portion of the tie under the head and strap portion.

The tabs 68, therefore, can be effective in keeping the free end 10 of the strap 8 aligned with the longitudinal axis 16 of the strap 8. Although this feature can be desirable when the tie 6 is mounted in a conventional manner around an item 64 as shown in FIG. 14, the tabs 68 are of particular value when the tie 6 is mounted around an item 64 in an inverted position (i.e., with the tabs 68 pointed inwardly toward the item 64) as shown in FIG. 15. In this position, the tabs 68, in combination with the exterior of the item 64, form a channel, best seen in FIG. 16, for confining and containing the free end 10 of the strap 8 and preventing it from slipping out sideways from under the tie 6. Preferably, the height of each tab 68 is sufficient to provide clearance for the strap as best seen in FIG. 16.

The tie embodiment 6 shown in FIGS. 11–16 is particularly well suited for uses, such as securing protective padding around the posts of playground equipment, wherein it is desirable to present a smooth exterior surface free of sharp edges that can cause injury. When the tie 6 is installed in the position shown in FIG. 15, the smooth bottom surface of the tie 6 is outermost, and the portion of the strap 8 that projects through the head 12 is confined by the tabs 68 safely and securely under the remainder of the tie 6. Accordingly, there is no need to clip off the free end 10 of the tie 6 as would be desirable if the tie were installed in the conventional manner shown in FIG. 14. Not only does this avoid the need for an additional step during installation, it also avoids the possibility of creating a sharp edge where the excess portion of the strap 8 is clipped off.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A parallel entry tie comprising:
    an elongate flexible strap having an elongate locking head at one end and a tail portion insertable through the locking head at another end; and,
    structure within the locking head for engaging and retaining the flexible strap when the tail portion of the strap is inserted through the locking head whereby the tie can be formed into a loop and secured in such a looped condition;
    the flexible strap further including an area of increased width adjacent the locking head and further having a plurality of raised straight tabs defining a channel for receiving the tail portion of the strap after the tail portion is inserted through the locking head.

2. A parallel entry tie as defined in claim 1 wherein the raised tabs are arranged in two parallel rows spaced by substantially the width of the tail portion of the strap.

3. A parallel entry tie as defined in claim 2 wherein each of the raised tabs extends to a height substantially equal to or greater than the thickness of the tail portion of the strap.

4. A parallel entry tie as defined in claim 1 wherein the area of increased width and the raised tabs are all integrally formed with the strap.

5. A parallel entry tie as defined in claim 1 wherein the locking head includes an entrance end, an exit end spaced from the entrance end, and a pair of spaced sidewalls defining a passage extending between the entrance end and the exit end in the direction of elongation of said strap.

6. A parallel entry tie as defined in claim 5 wherein the locking head further includes first and second ribs extending between the sidewalls and spaced from each other to define a first opening between the first and second ribs.

7. A parallel entry tie as defined in claim 6 further comprising third and fourth ribs extending between the sidewalls and displaced perpendicularly from the first and second ribs to define, in conjunction with the sidewalls and the first and second ribs the passageway.

8. A parallel entry tie as defined in claim 7 wherein the third and fourth ribs are laterally spaced from each other to define a second opening between the third and fourth ribs.

9. A parallel entry tie as defined in claim 8 wherein the structure for engaging and retaining the flexible strap includes a locking tab supported in the second opening by the third rib.

10. A parallel entry tie comprising:
    an elongate flexible strap having an elongate locking head at one end and a tail portion insertable through the locking head at another end; and,
    structure within the locking head for engaging and retaining the flexible strap when the tail portion of the strap is inserted through the locking head whereby the tie can be formed into a loop and secured in such a looped condition;
    the flexible strap further including an area of increased width adjacent the locking head and further having a plurality of opposed uninterrupted tabs defining an interior surface for receiving the tail portion of the strap after the tail portion is inserted through the locking head.

11. A parallel entry tie as claimed in claim 10 wherein the tabs are arranged in two parallel rows spaced by substantially the width of the tail portion of the strap.

12. A parallel entry tie as claimed in claim 10 wherein each of the tabs extends to a height substantially equal or greater than the thickness of the tail portion of the strap.

13. A parallel entry tie as defined in claim 10 wherein the area of increased width and the tabs are all integrally formed with the strap.

14. A parallel entry tie as defined in claim 10 wherein the locking head includes an entrance end, an exit end spaced from the entrance end, and a pair of spaced sidewalls defining a passage extending between the entrance end and the exit end in the direction of elongation of said strap.

* * * * *